United States Patent
Humphrey et al.

(10) Patent No.: US 6,459,784 B1
(45) Date of Patent: Oct. 1, 2002

(54) METHOD FOR THE DEFINITION OF A CALL FORWARD OPERATION WITHIN A TELECOMMUNICATIONS SYSTEM

(75) Inventors: George A. Humphrey, Ledgewood, NJ (US); Didier LeBoulzec, Thorigne Fouillard (FR)

(73) Assignee: Avaya Technology Corp., Basking Ridge, NJ (US)

( * ) Notice: Subject to any disclaimer, the term of this patent is extended or adjusted under 35 U.S.C. 154(b) by 0 days.

(21) Appl. No.: 09/375,646

(22) Filed: Aug. 17, 1999

(30) Foreign Application Priority Data

Aug. 21, 1998 (EP) .............................. 98460032

(51) Int. Cl.[7] .................... H04M 3/54; G06F 3/00; G06F 13/00
(52) U.S. Cl. ................... 379/211.02; 345/338
(58) Field of Search .................. 345/338, 333, 345/334, 335; 379/201, 207, 210, 211, 201.01, 201.12, 207.02, 211.01, 211.02; 707/10, 102; 717/1

(56) References Cited

U.S. PATENT DOCUMENTS

| | | | |
|---|---|---|---|
| 5,012,511 A | 4/1991 | Hanle et al. ............... 379/211 |
| 5,615,257 A | * 3/1997 | Pezzullo et al. ......... 379/201 X |
| 6,041,325 A | * 3/2000 | Shah et al. ................... 707/10 |

FOREIGN PATENT DOCUMENTS

EP  0 531 048 A2  8/1992  ............ H04M/3/42

OTHER PUBLICATIONS

"Remote Call Forwarding" IBM Technical Disclosure Bulletin, vol. 36, No. 6B, Jun. 1, 1993 pp. 267–268.

European Search Report dated Jan. 12, 1999.

* cited by examiner

Primary Examiner—Harry S. Hong
(74) Attorney, Agent, or Firm—Barry H. Freedman

(57) ABSTRACT

A method for defining a call forward operation in a telecommunications system. A user activates a call forward function, and receives a system response proposing a default value for the orginator. The user either validates the default originator or makes and validates an alternate choice. Once the originator is validated, the user receives a system response proposing a default value for the destination. Once again, the user either validates the default destination, or makes and validates an alternate choice. The originator and destination are identified by the system by an assigned number, user name or combination of assigned number and user name.

20 Claims, 3 Drawing Sheets

METHOD FOR THE DEFINITION OF A CALL FORWARD OPERATION WITHIN A TELECOMMUNICATIONS SYSTEM

CROSS-REFERENCE TO RELATED APPLICATION

This application claims priority of European Patent Application No. 98460032.0, which was filed on Aug. 21, 1998.

FIELD OF THE INVENTION

This invention relates generally to telecommunications systems, and, more particularly, to private automatic branch exchange (PABX) and/or public automatic exchanges in telecommunications systems and to a method for the definition of a call forward operation within a telecommunications system.

BACKGROUND OF THE INVENTION

In general, a private automatic branch exchange (PABX) manages a plurality of telephone sets distributed geographically within the premises of an undertaking, where each user makes use of one of these telephone sets. It is useful to be able to forward a call from one telephone set (known as the forwarded set) to another (known as the destination set) so that the calls intended for the forwarded set finally reach the destination set.

Conventionally, two types of call forward function are available to a telephone set user: a local call forward function and a remote call forward function.

In the first case (definition of a local forward function), the user, by means of his telephone keypad, keys in a code associated with the local call forward function, and then the number of the destination telephone set to which the call must be forwarded. Thus, the telephone set on which the local call forward operation has been programmed is the forwarded telephone set by default. Following the above two operations, a call reaching the forwarded telephone set is <<rerouted>> to the destination telephone set.

In the second case (definition of a remote call forward operation), the user, by means of his telephone keypad, keys in a code associated with the remote call forward function and then the number of the originator telephone set from which the call forward operation must take place (the forwarded telephone set). Consequently, following this programming operation, a call reaching the forwarded telephone set is rerouted to the telephone set on which the user has programmed the call forward operation. In other words, for a remote call forward operation, the destination telephone set is the telephone set on which the remote call forward programming has been done.

It appears that this solution presents several drawbacks.

First of all, each (local or remote) call forward function requires the user to have knowledge of a distinct code. Thus, to be able to perform both types of call forwarding operation, two different codes are necessary.

Then, it is not possible to program a call forward operation from a telephone set that is not involved in this forward operation (namely a set that is neither the forwarded telephone set nor the destination telephone set).

Furthermore, it is necessary to have preliminary knowledge of the number of the telephone set corresponding to the originator number and/or destination number.

Finally, the user may make a mistake when keying in the number of the telephone set (local forward) or that of the forwarded telephone set (remote forward). An error of this kind leads to a wrong rerouting.

The present invention is aimed especially at overcoming these different drawbacks of the prior art.

More specifically, one of the goals of the present invention is to provide a method for the definition of a call forward operation that requites only one code to generate a local call forward operation or a remote call forward operation.

An additional goal of the invention is to provide a method of this kind enabling the definition, furthermore, of a call forward operation from a telephone set that is not involved in the call forward operation defined (i.e. a method enabling the definition of a third-party call forward operation).

Another goal of the invention is to provide a method of this kind enabling a reduction of the risks of wrong rerouting due to a keying error on the number of the originator telephone set (or forwarded telephone set) or of the destination telephone set.

SUMMARY OF THE INVENTION

These various goals as well as others that shall appear hereinafter are achieved according to the invention by means of a method for the definition of a call forward operation, within a telecommunications system, for forwarding calls from an originator identifier towards the destination identifier, wherein the method comprises the following successive steps:

a user, from a user terminal (sometimes called a "definition terminal"), activates a generic call forward function;

the system proposes a first default value of said originator identifier;

the user makes a first choice between:
validating said default first value of said originator identifier;
determining and then validating a first other value of said originator identifier;

the system proposes a second default value of said destination identifier;

the user makes a second choice between:
validating said second default value of said destination identifier;
determining and then validating a second other value of said destination identifier.

The general principle of the invention relies therefore on the use of a generic call function enabling the definition of various forms of call forward operations.

Owing to the presentation of a default value of the originator identifier and/or the destination identifier, the call forward defining operation is facilitated. This provides for a gain in time when at least one of these two default values is validated. Indeed, the user does not have to enter the value or values. Furthermore, reducing the quantity of information (the identifier of the originator user terminal and/or the identifier of the destination user terminal) entered by the user results in a reduction of the risks of wrongful rerouting through keying errors.

The invention also enables the definition of a third type of call forward operation, namely a call forward operation performed by means of a user terminal that is not involved in the call forward operation (namely a user terminal whose identifier is neither that of the originator user terminal nor that of the destination user terminal).

Advantageously, said originator identifier and said destination identifier belong to the group comprising:

numbers assigned to elements of the telecommunications system;

user names;

combinations of at least one element number and at least one user name.

It is clear that the identifier is generally applicable to any type of identifier.

Preferably, said elements of the telecommunications system belong to the group comprising:

telephone sets;

answering and/or recording machines;

equipment providing for voice messaging services;

microcomputers.

This list of course is not exhaustive.

Advantageously, said definition user terminal belongs to the group comprising:

telephone sets;

microcomputers.

It is clear that any type of device fulfilling the functions of a telephone set may be suitable as a user terminal.

It must be noted that the telephone sets notably comprise wire telephone sets and mobile telephone sets used in radio-communication systems.

Advantageously, the step in which the user determines said first other value comprises a step of entry and/or a step for the selection, from a first list of predetermined values, of said first other value.

It will be noted that these two actions (entry and selection) may be proposed successively. The selection action has the advantage, as compared with the entry operation, of reducing the risks of wrong rerouting due to a keying error on the identifier of the originator user terminal. Furthermore, this enables an increase in the speed of the operation for defining the call forward operation.

Preferably, the step in which the user determines said second other value comprises a step of entry and/or a step for the selection, from a second list of predetermined values, of second other value.

Preferably, said method is implemented in at least one automatic exchange or switch of said telecommunications system.

Advantageously, said first default value or other value of said originator identifier belongs to the group comprising values of identifiers internal to said automatic exchange.

Preferably, said first default value of said originator identifier is the value of the identifier of said definition user terminal.

Thus, when the desired originator identifier is that of the identifier of the definition user terminal, this enables a gain in time for the user defining the call forward operation.

Advantageously, said second default value or other value of said destination identifier belongs to the group comprising:

values of identifiers internal to said automatic exchange;

values of identifiers external or off premises with respect to said automatic exchange.

In other words, the value of the destination identifier belongs to a group that is a super-set of the group comprising the originator identifier value.

A characteristic of this kind makes it possible for example for the habitual user of the definition user terminal to be reached even when he is away from the local site associated with the automatic exchange managing the definition user terminal. In other words, the automatic exchange managing the destination user terminal may be different from the one managing the definition user terminal.

Advantageously, said method further comprises a step for permitting/prohibiting the taking of said default value or other value of said originator identifier from among at least certain of said identifier values internal to said automatic exchange.

In other words, it is possible to limit the choice of the originator identifier. It will be understood that a limitation of this kind is useful only for the <<remote>> call forward operations or the third party (user terminal) call forward operations since the originator identifier of the local forward calls is that of the definition user terminal.

In a preferred embodiment of the invention, said method furthermore comprises a step of permitting/prohibiting the taking of said second default value or other value of said destination identifier from among at least certain of said identifier values internal to said automatic exchange and/or at least certain of said identifier values external to or off premises with respect to said automatic exchange.

In other words, it is possible to limit the choice of the destination identifier. It will be understood that a limitation of this kind is useful only for local call forward operations or third party (user terminal) call forward operations since the destination identifier of the "remote" call forward operations is that of the definition user terminal.

Advantageously, said second default value of said destination identifier is a predetermined preference value, which is a function of the value of said originator identifier validated by the user.

This presentation by default of a predetermined preference value, which is function of the originator identifier, as a destination identifier, enables an increase in most cases of the speed of execution of the call forward definition operation.

Furthermore, this makes it possible to avoid entry errors and hence reduce the risks of wrong rerouting due to a keying error on the identifier of the destination user terminal.

Preferably, said method comprises a preliminary step for the determination, by the user, of said predetermined preference value.

Advantageously, said preliminary step for the determination, by the user, of said predetermined preference value comprises a step of entry and/or a step of selection, from a third list of predetermined values, of said preference value.

Advantageously, said method furthermore comprises a step for the selection of at least one type of activation of the call forward operation defined during the previous steps, said type of activation belonging to the group comprising:

an "immediate" activation without bringing about the ringing of the element associated with said originator identifier;

a "deferred" activation after the element associated with the originator identifier has rung for a predetermined number of times and/or during a predetermined duration;

an "if busy" activation if the element associated with the originator identifier is busy.

This list of types of activation of the call forward operation is in no way restrictive.

For example, if the forwarded user terminal is that of a department head, a call intended initially for this forwarded user terminal may be rerouted:

either towards the user terminal of a secretary if the user terminal is busy (activation "if busy");

or, as a second choice, towards the user terminal of the department head, after the forwarded user terminal has rung for a specified number of times (deferred activation);

or directly towards a user terminal located in a room in which there is the department head (<<immediate>> activation).

It must be noted that according to another embodiment, one of the types of activation may be proposed by default. In this case, the user may modify or preserve this type of activation proposed by default.

It will be noted that, even if these types of activation are exclusive with respect to one another, it is possible to select several of them. It is clear however that certain types of activation (for example <<immediate>> activation) have a priority character. The value of a multiple selection with several levels of priority lies especially in the fact that it mitigates possible problems with one particular type of activation. For example, if immediate activation does not work, the operation passes on to another type of activation (for example deferred activation).

Preferably, said step of activation of the generic call forward function itself comprises a step of entering a predetermined code associated with said action.

Thus, the user needs to know only one code, that of the generic call forward function, for all forms of call forwarding. It may be recalled that, unlike in the prior art, the user must know two codes (one for the local call forward function and the other for the remote call forward function).

Preferably, said call forward operation belongs to the group comprising:

- the "local" call forward operations for each of which the value of said originator identifier validated by the user is the value of the identifier of the definition user terminal;
- the "remote" call forward operations for each of which the value of said destination identifier validated by the user is the value of the identifier of the definition user terminal;
- the "third party" call forward operations, for each of which neither the value of said originator identifier validated by the user nor the value of said destination identifier validated by the user is the value of the identifier of the definition user terminal, Thus, in addition to the local forwarding and the remote forwarding, the invention enables forwarding "by a third party (user terminal)", namely a user terminal distinct from those (<<forwarded>>, and <<destination>>,) terminals that are concerned by the call forward operation appeal to be defined. This averts the need, in particular, for the user to go to an office in which there is either the forwarded user terminal or the destination user terminal.

It will be understood that a call forward operation of this kind by a third party user terminal may be done either by the habitual user of the forwarded user terminal or by a third party (for example a secretary who defines a call forward operation between two employees of the company from his or her own user terminal).

A characteristic, such as this, of possible intervention by a third party promotes a certain degree of flexibility in the definition of the call forward operation.

Preferably, said method furthermore comprises a step for the entry, by the user, of a password so that said method is not completely executed unless the user enters said password.

Thus, only the person or persons who know this code can perform the operation of defining a call forward operation. This prevents any involuntary diversion of a call (due to an error of entry with respect to the destination identifier) or any deliberate diversion (by a fraudulent individual).

In a first advantageous embodiment, said step of entry, by the user, of a password immediately follows said step of activation of the generic call forward function.

In this first embodiment, the entry of the password is therefore demanded as a matter of routine.

In a second advantageous embodiment, said step for the entry, by the user, of a password immediately follows the step during which the user validates a value of said originator identifier, and said step of entry is performed only if the value of said originator identifier validated by the user during the previous step is not said first default value.

In this second embodiment, the entering of the password is not done as a matter of routine but is aimed only at ensuring that only one authorized individual can make a call forward operation that is other than local (namely a remote call forward or third party call forward operation). Consequently, this ensures a certain degree of protection against any unauthorized use of the definition user terminal for the definition of a forward call by an outside user.

BRIEF DESCRIPTION OF THE DRAWINGS

Other characteristics and advantages of the invention shall appear from the following description of a preferred embodiment of the invention, given as a simple and non-restrictive illustration made with reference to the appended drawings, of which.

DETAILED DESCRIPTION

Figure 1:
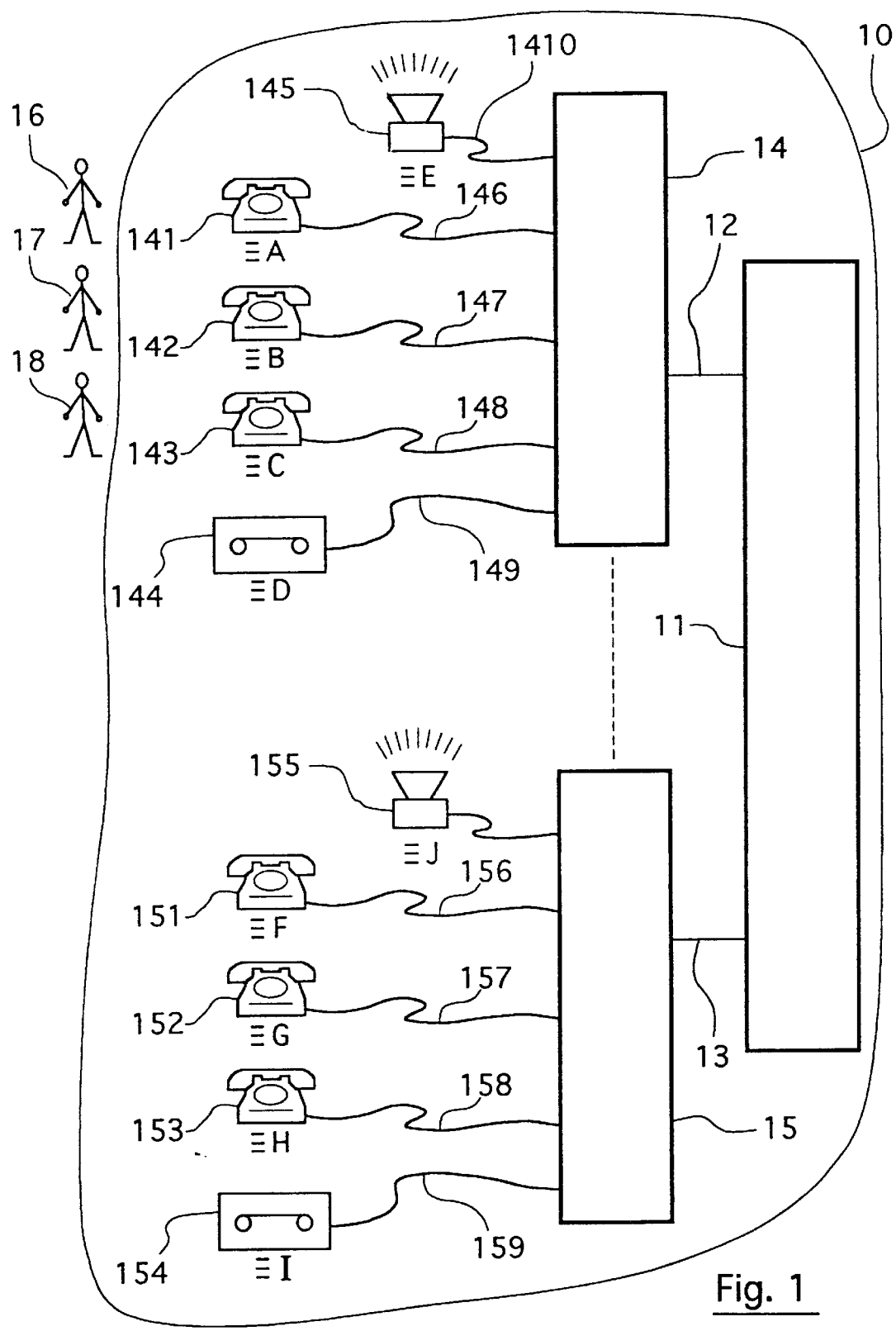
FIG. 1 shows a simplified drawing of a telecommunications system in which it is possible to implement the method, according to the invention, for the definition of a forward call.

A view shall now be given, with reference to FIG. 1, of a telecommunications system in which it is possible to implement the method according to the invention for defining an operation of forwarding a call from a source or originator identifier to a destination identifier.

Figure 2A:
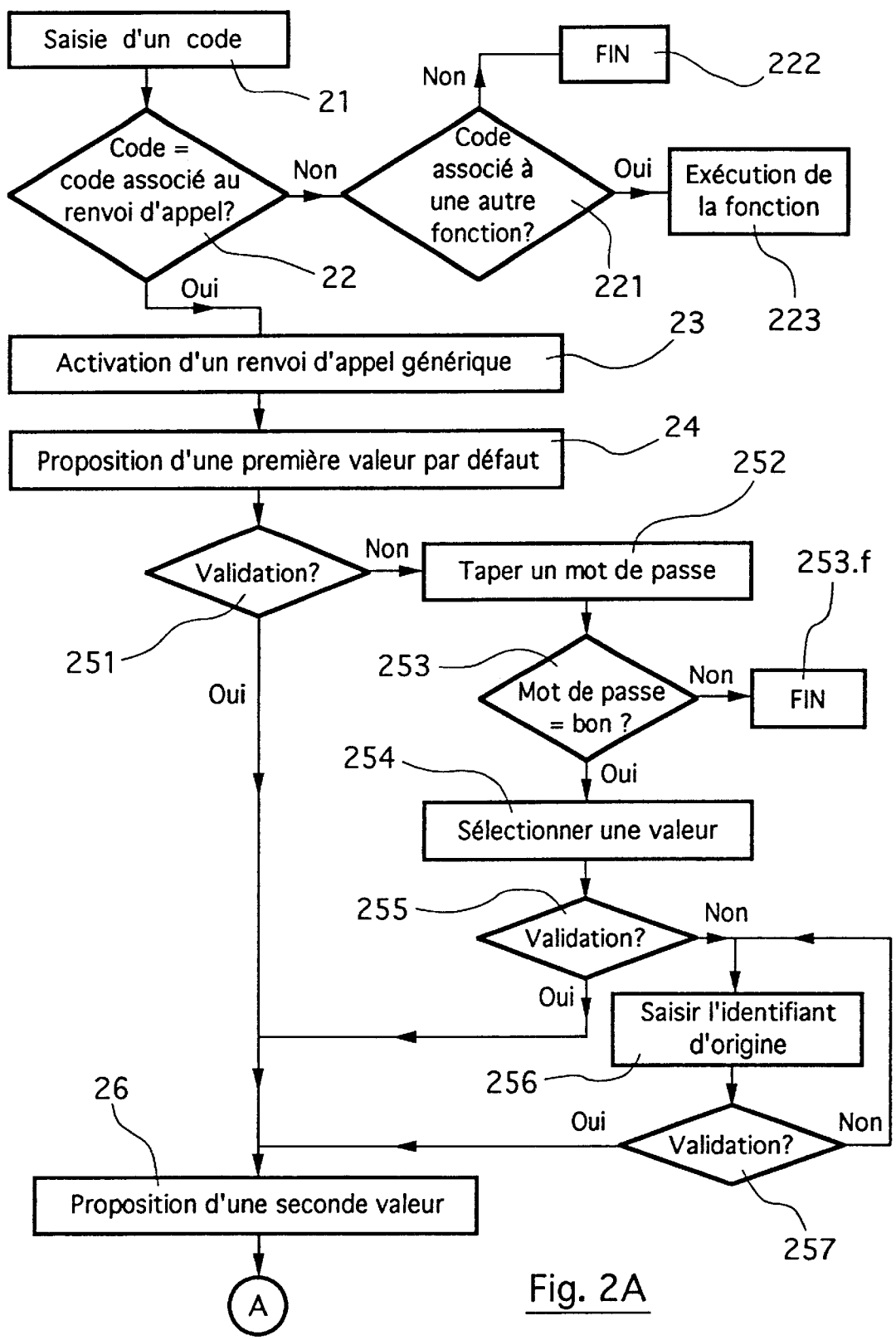
FIGS. 2A and 2B give a view, in two parts related to each other, of a simplified flow chart of a particular embodiment of the method according to the invention for the definition of a call forward operation.
Figure 2B:
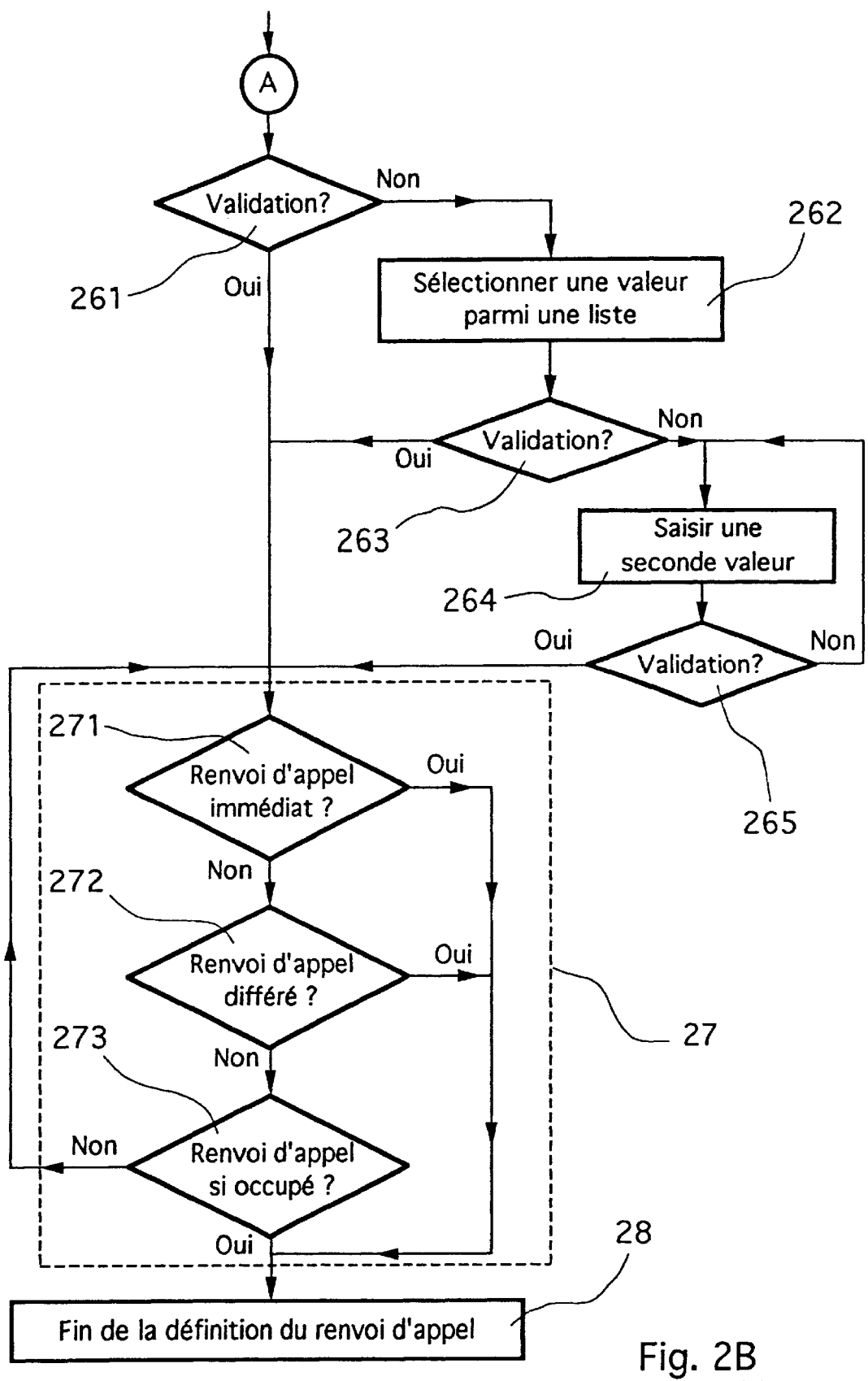

In the example shown here below with reference to FIGS. 1, 2A, and 2B, it is assumed that the telecommunications system corresponds to a wire telephone system 10.

In a standard way, the telephone network 11 comprises a plurality of public and/or private automatic exchanges 14, 15.

By way of an example, we shall consider a first private automatic branch exchange (or PABX) 14 that is connected to the telephone network 11 through a telephone link 12 and that manages, for example, a plurality of user terminals 141 to 143, an answering and/or recording machine 144 and a voice messaging service 145. Each of the user terminals 141 to 143 is connected to the automatic exchange 14 through telephone links 146 to 148. The answering and/or recording device 144 is connected to the automatic exchange 14 through a telephone link 149. The voice messaging service 145 is connected to the automatic exchange 14 through a link 1410. With each of these different elements 141 to 145, connected to the automatic exchange 14, an identifier A to E is associated. This identifier A to E comprises in particular the number of the element of the telephone system and/or the name or names of the user or users. The user terminals 141 to 143 include especially telephone sets and microcomputers.

The elements of the telecommunications system may be especially telephone sets 141 to 143, 151 to 153, answering and/or recording machines 144, 154, equipment providing for a voice messaging service 145, 155, microcomputers (not shown), etc.

Again, by way of an example, we shall consider a second private automatic exchange 15 that is connected to the telephone system 11 through a telephone link 13 and that manages, for example, a plurality of user terminals 151 to 153, an answering and/or recording device 154 and a voice messaging service 155. Each of the user terminals 151 to 153 is connected to the automatic exchange 15 through telephone links 156 to 158. The answering and/or recording machine 154 is connected to the automatic exchange 15 through a telephone link 159. The voice message service 155 is connected to the automatic exchange 15 through a link 1510. With each of these different elements 151 to 155 connected to the automatic exchange 15 an identifier F to J is associated.

According to the invention, whatever the type of call forward operation to be generated, the user uses one and the same generic call forward function (he needs to know only one code, that of the generic call forward function).

Three types of call forward operations can be distinguished:

the <<local>> call forward operation: for example, from the user terminal (called the definition user terminal) referenced 141, a user 16 defines a call forward operation from the identifier A (called the originator identifier) which is associated with the user terminal referenced 141 (called the forwarded user terminal) to the identifier B (called the destination identifier) associated with the user terminal referenced 142 (called the destination user terminal). A call forward operation of this kind is said to be local because the originator identifier (A) is identical to the identifier of the definition user terminal (user terminal referenced 141);

the <<remote>> call forward operation: for example, from the user terminal referenced 142 (called the definition user terminal), a user 17 defines a call forward operation from the identifier A (called the source or originator identifier) which is associated with the user terminal referenced 141 (called the forwarded user terminal), to the identifier B (called the destination identifier) which is associated with the user terminal 142 (called the destination user terminal). A call forward operation of this kind is said to be remote because the destination identifier (B) is identical to the identifier of the definition user terminal (user terminal referenced 142);

the <<third party>> call forward operation: for example, from the user terminal referenced 143 (called the definition user terminal), a user 18 defines a call forward operation from the identifier A (called the originator identifier), which is associated with the user terminal referenced 141 (called the forwarded user terminal) to the identifier B (called the destination identifier) which is associated with the user terminal referenced 142 (called the destination user terminal). A call forward operation of this kind is called a "third party" call forward operation because neither the destination identifier (B) nor the originator identifier (A) corresponds to the identifier of the definition user terminal (user terminal referenced 143).

In the three examples mentioned here above, the originator identifier and the destination identifier are internal to the automatic exchange 14 to which the definition user terminal (namely the user terminal on which the user defines the call forward operation) is connected.

It is laid down for example that the originator identifier should be an identifier internal to this automatic exchange 14. By contrast, the destination identifier may be an identifier that is either internal or external (off premises) with respect to this automatic exchange 14.

With reference to the simplified flow chart of FIG. 2, we shall now present a particular mode of application of the method according to the invention for defining a call forward operation within a telecommunications system.

In order to activate the generic call forward function, the user enters (21) a code at any user terminal (this user terminal is hereinafter called a "definition user terminal").

It is assumed here that, during a step prior to the activation of the generic call forward function, the user has entered a list of predetermined identifiers (to be keyed in at least once). This list of predetermined identifiers may be updated. It must be noted that an updating operation of this kind can be implemented especially during any operation of keying in a user terminal identifier for a call forward operation.

The automatic exchange (to which the definition user terminal is connected) compares (22), the entered code, with each of the codes of a list of predetermined codes, each associated with a particular function. If the entered code does not correspond to the code of the generic call forward function and is not (221) associated with any other function either, then the execution of the method is interrupted (222). If the entered code corresponds to a code associated with another function, this other function is performed (223) (this is for example a function to record a new user terminal identifier in a list of predetermined identifiers).

When the entered code corresponds to the code of the generic call forward function, the automatic exchange activates (23) this generic call forward function.

Following the activation of the generic call forward function, the system proposes (24) a first default value of the originator identifier of the call forward operation to be defined. The default value of the originator identifier is for example the value of the identifier of the definition user terminal so as to reduce, in most cases, the time needed to define the call forward operation.

Then, the user makes a first choice (251): either he validates the first default value of the originator identifier or he determines another fist value of the originator identifier. As explained here below, this determination can be understood in the broad sense: it may be a selection (254) from a first list of predetermined values and/or an entry (256) of a non-preregistered value. In the example given in detail here below, the two actions (selection 254 and entry 256) may succeed each other.

It must be noted that a first default value or other default value of the originator identifier belongs to the values of identifiers internal to the automatic exchange connected to the definition user terminal.

Optionally, the system may ask (252) the user to enter a password. This request may come into play (see FIG. 2A) if the user has indicated that he wishes to determine an originator identifier value different from the default proposed value.

According to a first variant, the step of entering the password immediately follows the step (23) for the activation of the generic call forward function.

If the entered password is correct, the system may propose (254) to the user that he selects a user terminal identifier from a first list of predefined identifiers. The identifiers of the first list have for example been defined especially during a previous call forward operation. It is clear that it may also be a list of preferred identifiers which the user has for example defined so that he does not have to key them in again.

If not, namely when the password entered is incorrect, the execution of the method (253f) is brought to an end.

When the password is right and no identifier of the list of predefined identifiers proposed has been confirmed, the system (256) asks the user to key in a first other value of the originator identifier. This first other value is therefore new for it does not belong to the first list of predetermined identifiers.

Optionally, it is possible to provide for a step to permit/prohibit the taking of the first default value or other value of the originator identifier from at least certain of the identifier values internal to the automatic exchange connected to the definition user terminal. This makes it possible in particular to limit fraud.

According to one alternative, any identifier value keyed in is inserted automatically into the first list of predetermined identifiers.

In short, the user (251 or 255 or 257) validates a first value of the originator identifier which is either that of the identifier of the definition user terminal or that of the identifier selected in a first list of predetermined identifiers or that of a keyed-in identifier.

After this validation, the system proposes (26) a second default value of the destination identifier to the user. This second default value of the destination identifier is for example a value selected by the user from a third predetermined preferred list, this third list possibly being itself a function of the value of the originator identifier validated by the user. This preferred third list may be drawn up in particular as a function of identifiers appearing at least a predetermined number of times during the definitions of previous call forward operations. It is possible, as the case may be, to envisage that this third list is a sub-list of the second list of the predetermined identifier values.

Just as in the case of the first value of the originator identifier, the user operates a second choice (261) (cf. FIG. 2B): either he validates the second default value of the destination identifier or he determines another second value of the destination identifier. This determination must be understood in the broad sense: it may be a selection (262) from a second list of predetermined values and/or an entry (264) of a second other non-prerecorded value. In the example given in detail here below, the two actions (selection 262 and entry 264) may succeed each other.

Optionally, it is possible to provide for a step of permitting/prohibiting the taking of the second default value or other value of the destination identifier from at least certain of the identifier values that are internal to and/or at least some of the identifier values that are external or off premises with respect to the automatic exchange connected to the definition user terminal. This makes it possible in particular to limit fraud.

If the user does not confirm the value of the proposed identifier as a value of the destination identifier, the system asks him (262) to select an identifier from a second list of predefined identifiers. This second list comprises, for example, values of destination identifiers that have already been the object of a definition, especially during a previous call forward operation.

When no identifier of the second list of predefined identifiers is confirmed, the system asks (264) the user to key in another second value of the destination identifier. In this case, this second other value is new since it is not included in the second list of preferred identifiers.

Optionally, it is possible to envisage the insertion of any new value of the keyed-in identifier directly into the second list of preferred identifiers as a function of the originator identifier.

In short, the user validates (261 or 263 or 265) a second value which is either the one coming from the third list (preferred value as a function of the originator value) or that of the identifier selected from the second list of predefined identifiers or that of a new keyed-in identifier.

After this validation, the system may optionally propose a step 27 to the user. This is a step for the selection of at least one type of activation of the call forward operation defined beforehand (during the steps 21 to 265).

This selection step 27 itself comprises several successive steps explained here below:

the system asks (271) the user if he wishes to validate an immediate call forward operation. If the user validates this first choice, a call forward operation will be implemented immediately without bringing about the ringing of the user terminal associated with the originator identifier;

if not, i.e. if the user does not validate this first choice, the system asks him (272) if he wishes to validate a deferred call forward operation, if the user validates this second choice, a call forward operation will be implemented when the user of the user terminal associated with the originator identifier does not take account of the call at the end of a duration that is predetermined and/or corresponds to a predetermined number of rings;

if not again, i.e. if the user does not validate these first and second choices, the system asks him (273) if he wishes to validate a call forward operation when the user terminal associated with the originator identifier is busy. If the user validates this third choice, a call forward operation is implemented when the call reaches the originator identifier at a time when the user of the user terminal associated with the originator identifier is engaged in a call.

After a validation of any one of the choices proposed during the above steps 271 to 273, the definition of the call forward operation is terminated (28).

It is clear that it is possible to consider proposing other types of call forward activation to the user while, at the same time, remaining within the framework of the present invention.

If the user validates none of the three types of call forward activation proposed, the above steps 271 to 273 are reiterated until the obtaining of a validation of at least one type of call forward activation.

What is claimed is:

1. A method for the definition of a call forward operation, within a telecommunications system (10), for forwarding calls from an originator identifier (A to J) towards a destination identifier (A to J), wherein the method comprises the following successive steps:

a user (16, 17, 18), from a definition user terminal (141, 142, 143), activates (23) a generic call forward function;

the system proposes (24) a first default value (A to J) of said originator identifier;

the user (16, 17, 18) makes a first choice between:
validating (251) said default first value (A to J) of said originator identifier;
determining (254, 256) and then validating (255, 257) a first other value (A to J) of said originator identifier, the system proposes (26) a second default value (A to J) of said destination identifier;

the user (16, 17, 18) makes a second choice between:
validating (261) said second default value (A to J) of said destination identifier;

determining (262, 264) and then validating (263, 265) a second other value(A to J) of said destination identifier, wherein said originator identifier and said destination identifier belong to the group comprising:

numbers assigned to elements of the telecommunications system (10);

user names;

combinations of at least one element number and at least one user name.

2. A method for the definition of a call forward operation, within a telecommunications system (10), for forwarding calls from an originator identifier (A to J) towards a destination identifier (A to J), wherein the method comprises the following successive steps:

a user (16, 17, 18), from a definition user terminal (141, 142, 143), activates (23) a generic call forward function;

the system proposes (24) a first default value (A to J) of said originator identifier;

the user (16, 17, 18) makes a first choice between:
  validating (251) said default first value (A to J) of said originator identifier;
  determining (254, 256) and then validating (255, 257) a first other value (A to J) of said originator identifier, the system proposes (26) a second default value (A to J) of said destination identifier;

of said originator identifier, the system proposes (26) a second default value (A to J) of said destination identifier;

the user (16, 17, 18) makes a second choice between:
  validating (261) said second default value (A to J) of said destination identifier;
  determining (262, 264) and then validating (263, 265) a second other value (A to J) of said destination identifier, wherein said elements of the telecommunications system (10) belong to the group comprising:

telephone sets (141 to 143, 151 to 153);

answering and/or recording machines (144, 154);

equipment providing for voice messaging services (145, 155);

microcomputers.

3. A method for the definition of a call forward operation, within a telecommunications system (10), for forwarding calls from an originator identifier (A to J) towards a destination identifier (A to J), wherein the method comprises the following successive steps:

a user (16, 17, 18), from a definition user terminal (141, 142,143), activates (23) a generic call forward function;

the system proposes (24) a first default value (A to J) of said originator identifier;

the user (16, 17, 18) makes a first choice between:
  validating (251) said default first value (A to J) of said originator identifier;
  determining (254, 256) and then validating (255, 257) a first other value (A to J) of said originator identifier, the system proposes (26) a second default value (A to J) of said destination identifier;

the user (16, 17, 18) makes a second choice between:
  validating (261) said second default value (A to J) of said destination identifier;
  determining (262, 264) and then validating (263, 265) a second other value (A to J) of said destination identifier, wherein said definition user terminal belongs to the group comprising:

telephone sets;

microcomputers.

4. A method for the definition of a call forward operation, within a telecommunications system (10), for forwarding calls from an originator identifier (A to J) towards a destination identifier (A to J), wherein the method comprises the following successive steps:

a user (16, 17, 18), from a definition user terminal (141, 142, 143), activates (23) a generic call forward function;

the system proposes (24) a first default value (A to J) of said originator identifier;

the user (16, 17, 18) makes a first choice between:
  validating (251) said default first value (A to J) of said originator identifier;
  determining (254, 256) and then validating (255, 257) a first other value (A to J) of said originator identifier, the system proposes (26) a second default value (A to J) of said destination identifier;

the user (16, 17, 18) makes a second choice between:
  validating (261) said second default value (A to J) of said destination identifier;
  determining (262, 264) and then validating (263, 265) a second other value (A to J) of said destination identifier, wherein the step in which the user determines said first other value comprises a step of entry and/or a step for the selection, from a first list of predetermined values, of said first other value.

5. A method for the definition of a call forward operation, within a telecommunications system (10), for forwarding calls from an originator identifier (A to J) towards a destination identifier (A to J), wherein the method comprises the following successive steps:

a user (16, 17, 18), from a definition user terminal (141, 142, 143), activates (23) a generic call forward function;

the system proposes (24) a first default value (A to J) of said originator identifier;

the user (16, 17, 18) makes a first choice between:
  validating (251) said default first value (A to J) of said originator identifier;
  determining (254, 256) and then validating (255, 257) a first other value (A to J) of said originator identifier, the system proposes (26) a second default value (A to J) of said destination identifier;

identifier;

the user (16, 17, 18) makes a second choice between:
  validating (261) said second default value (A to J) of said destination identifier;
  determining (262, 264) and then validating (263, 265) a second other value (A to J) of said destination identifier, wherein the step in which the user determines said second other value comprises a step of entry and/or a step for the selection, from a second list of predetermined values, of second other value.

6. A method for the definition of a call forward operation, within a telecommunications system (10), for forwarding calls from an originator identifier (A to J) towards a destination identifier (A to J), wherein the method comprises the following successive steps:

a user (16, 17, 18), from a definition user terminal (141, 142, 143), activates (23) a generic call forward function;

the system proposes (24) a first default value (A to J) of said originator identifier;

the user (16, 17, 18) makes a first choice between:
   validating (251) said default first value (A to J) of said originator identifier;
   determining (254, 256) and then validating (255, 257) a first other value (A to J) of said originator identifier, the system proposes (26) a second default value (A to J) of said destination identifier;

identifier;

the user (16, 17, 18) makes a second choice between:
   validating (261) said second default value (A to J) of said destination identifier;
   determining (262, 264) and then validating (263, 265) a second other value (A to J) of said destination identifier, said telecommunications system (10) implementing at least one public automatic exchange and/or at least one private (14, 15) automatic exchange, wherein said method is implemented in at least one automatic exchange (14, 15) of said telecommunications system (10).

7. A method for the definition of a call forward operation, within a telecommunications system (10), for forwarding calls from an originator identifier (A to J) towards a destination identifier (A to J), wherein the method comprises the following successive steps:

a user (16, 17, 18), from a definition user terminal (141, 142, 143), activates (23) a generic call forward function;

the system proposes (24) a first default value (A to J) of said originator identifier;

the user (16, 17, 18) makes a first choice between:
   validating (251) said default first value (A to J) of said originator identifier;
   determining (254, 256) and then validating (255, 257) a first other value (A to J) of said originator identifier, the system proposes (26) a second default value (A to J) of said destination identifier;

the user (16, 17, 18) makes a second choice between:
   validating (261) said second default value (A to J) of said destination identifier;
   determining (262, 264) and then validating (263, 265) a second other value (A to J) of said destination identifier, said method being implemented in at least one automatic exchange (14, 15) of said telecommunications system (10), said definition user terminal (141, 142, 143) being connected to said automatic exchange (14, 15), wherein said first default value or other value (A to J) of said originator identifier belongs to the group comprising values of identifiers internal to said automatic exchange (14, 15).

8. A method for the definition of a call forward operation, within a telecommunications system (10), for forwarding calls from an originator identifier (A to J) towards a destination identifier (A to J), wherein the method comprises the following successive steps:

a user (16, 17, 18), from a definition user terminal (141, 142, 143), activates (23) a generic call forward function;

the system proposes (24) a first default value (A to J) of said originator identifier;

the user (16, 17, 18) makes a first choice between:
   validating (251) said default first value (A to J) of said originator identifier;
   determining (254, 256) and then validating (255, 257) a first other value (A to J) of said originator identifier, the system proposes (26) a second default value (A to J) of said destination identifier;

the user (16, 17, 18) makes a second choice between:
   validating (261) said second default value (A to J) of said destination identifier;
   determining (262, 264) and then validating (263, 265) a second other value (A to J) of said destination identifier, wherein said first default value (A to J) of said originator identifier is the value (A to J) of the identifier of said definition user terminal (141, 142, 143).

9. A method for the definition of a call forward operation, within a telecommunications system (10), for forwarding calls from an originator identifier (A to J) towards a destination identifier (A to J), wherein the method comprises the following successive steps:

a user (16, 17, 18), from a definition user terminal (141, 142, 143), activates (23) a generic call forward function;

the system proposes (24) a first default value (A to J) of said originator identifier;

the user (16, 17, 18) makes a first choice between:
   validating (251) said default first value (A to J) of said originator identifier;
   determining (254, 256) and then validating (255, 257) a first other value (A to J) of said originator identifier, the system proposes (26) a second default value (A to J) of said destination identifier;

the user (16, 17, 18) makes a second choice between:
   validating (261) said second default value (A to J) of said destination identifier;
   determining (262, 264) and then validating (263, 265) a second other value (A to J) of said destination identifier, said method being implemented in at least one automatic exchange (14, 15) of said telecommunications system (10), said definition user terminal (141, 142, 143) being connected to said automatic exchange (14, 15), wherein said second default value (A to J) or other value of said destination identifier belongs to the group comprising:

values of identifiers internal to said automatic exchange (14, 15);

values of identifiers off premises with respect to said automatic exchange (14, 15).

10. A method for the definition of a call forward operation, within a telecommunications system (10), for forwarding calls from an originator identifier (A to J) towards a destination identifier (A to J), wherein the method comprises the following successive steps:

a user (16, 17, 18), from a definition user terminal (141, 142, 143), activates (23) a generic call forward function;

the system proposes (24) a first default value (A to J) of said originator identifier;

the user (16, 17, 18) makes a first choice between:
   validating (251) said default first value (A to J) of said originator identifier,
   determining (254, 256) and then validating (255, 257) a first other value (A to J) of said originator identifier, the system proposes (26) a second default value (A to J) of said destination identifier;

the user (16, 17, 18) makes a second choice between:
  validating (261) said second default value (A to J) of said destination identifier;
  determining (262, 264) and then validating (263, 265) a second other value (A to J) of said destination identifier,
said method being implemented in at least one automatic exchange (14, 15) of said telecommunications system (10), said definition user terminal (141, 142, 143) being connected to said automatic exchange (14, 15), wherein said method comprises a step for permitting/prohibiting the taking of said default value (A to J) or other value of said originator identifier from among at least certain of said identifier values internal to said automatic exchange (14, 15).

11. A method for the definition of a call forward operation, within a telecommunications system (10), for forwarding calls from an originator identifier (A to J) towards a destination identifier (A to J), wherein the method comprises the following successive steps:
  a user (16, 17, 18), from a definition user terminal (141, 142, 143), activates (23) a generic call forward function;
  the system proposes (24) a first default value (A to J) of said originator identifier;
  the user (16, 17, 18) makes a first choice between:
    validating (251) said default first value (A to J) of said originator identifier;
    determining (254, 256) and then validating (255, 257) a first other value (A to J) of said originator identifier,
  the system proposes (26) a second default value (A to J) of said destination identifier;
  the user (16, 17, 18) makes a second choice between:
    validating (261) said second default value (A to J) of said destination identifier;
    determining (262, 264) and then validating (263, 265) a second other value (A to J) of said destination identifier,
  said method being implemented in at least one automatic exchange (14, 15) of said telecommunications system (10), said definition user terminal (141, 142, 143) being connected to said automatic exchange (14, 15), wherein said method furthermore comprises a step of permitting/prohibiting the taking of said second default value (A to J) or other value of said destination identifier from among at least certain of said identifier values internal to said automatic exchange and/or at least certain of said identifier values that are off premises with respect to said automatic exchange (14, 15).

12. A method for the definition of a call forward operation, within a telecommunications system (10), for forwarding calls from an originator identifier (A to J) towards a destination identifier (A to J), wherein the method comprises the following successive steps:
  a user (16, 17, 18), from a definition user terminal (141, 142, 143), activates (23) a generic call forward function;
  the system proposes (24) a first default value (A to J) of said originator identifier;
  the user (16, 17, 18) makes a first choice between:
    validating (251) said default first value (A to J) of said originator identifier;
    determining (254, 256) and then validating (255, 257) a first other value (A to J) of said originator identifier,
  the system proposes (26) a second default value (A to J) of said destination identifier;
  the user (16, 17, 18) makes a second choice between:
    validating (261) said second default value (A to J) of said destination identifier;
    determining (262, 264) and then validating (263, 265) a second other value (A to J) of said destination identifier,
  wherein said second default value of said destination identifier is a predetermined preference value (A to J), which is function of the value (A to J) of said originator identifier validated by the user (16, 17, 18).

13. A method according to claim 12, comprising a preliminary step for the determining, by the user, of said predetermined preference value.

14. A method according to claim 13, wherein said preliminary step for the determination, by the user, of said predetermined preference value comprises a step of entry and/or a step of selection, from a third list of predetermined values, of said preference value.

15. A method for the definition of a call forward operation, within a telecommunications system (10), for forwarding calls from an originator identifier (A to J) towards a destination identifier (A to J), wherein the method comprises the following successive steps:
  a user (16, 17, 18), from a definition user terminal (141, 142, 143), activates (23) a generic call forward function;
  system proposes (24) a first default value (A to J) of said originator identifier;
  the user (16, 17, 18) makes a first choice between:
    validating (251) said default first value (A to J) of said originator identifier;
    determining (254, 256) and then validating (255, 257) a first other value (A to J) of said originator identifier,
  the system proposes (26) a second default value (A to J) of said destination identifier;
  the user (16, 17, 18) makes a second choice between:
    validating (261) said second default value (A to J) of said destination identifier;
    determining (262, 264) and then validating (263, 265) a second other value (A to J) of said destination identifier,
  furthermore comprising a step (27) for the selection of at least one type of activation of the call forward operation defined during the previous steps, said type of activation belonging to the group comprising:
    an "immediate" activation without bringing about the ringing of the element associated with said originator identifier,
    a "deferred" activation after the element associated with the originator identifier has rung for a predetermined number of times and/or during a predetermined duration;
    an "if busy" activation if the element associated with the originator identifier is busy.

16. A method for the definition of a call forward operation, within a telecommunications system (10), for forwarding calls from an originator identifier (A to J) towards a destination identifier (A to J), wherein the method comprises the following successive steps:
  a user (16, 17, 18), from a definition user terminal (141, 142, 143), activates (23) a generic call forward function;
  the system proposes (24) a first default value (A to J) of said originator identifier;
  the user (16, 17, 18) makes a first choice between:

validating (251) said default first value (A to J) of said originator identifier;

determining (254, 256) and then validating (255, 257) a first other value (A to J) of said originator identifier, the system proposes (26) a second default value (A to J) of said destination identifier;

the user (16, 17, 18) makes a second choice between:

validating (261) said second default value (A to J) of said destination identifier;

determining (262, 264) and then validating (263, 265) a second other value (A to J) of said destination identifier, wherein said step (23) of activation of the generic call forward function itself comprises a step (21) for the entry of a predetermined code associated with said action.

17. A method for the definition of a call forward operation, within a telecommunications system (10), for forwarding calls from an originator identifier (A to J) towards a destination identifier (A to J), wherein the method comprises the following successive steps:

a user (16,17, 18), from a definition user terminal (141, 142, 143), activates (23) a generic call forward function;

the system proposes (24) a first default value (A to J) of said originator identifier;

the user (16, 17, 18) makes a first choice between:

validating (251) said default first value (A to J) of said originator identifier;

determining (254, 256) and then validating (255, 257) a first other value (A to J) of said originator identifier, the system proposes (26) a second default value (A to J) of said destination identifier;

the user (16, 17, 18) makes a second choice between:

validating (261) said second default value (A to J) of said destination identifier;

determining (262, 264) and then validating (263, 265) a second other value (A to J) of said destination identifier, wherein said call forward operation belongs to the group comprising:

the "local" call forward operations for each of which the value of said originator identifier validated by the user (16, 17, 18) is the value(A to J) of the identifier of the definition user terminal (141, 142, 143);

the "remote" call forward operations for each of which the value (A to J) of said destination identifier validated by the user (16, 17, 18) is the value of the identifier of the definition user terminal (141, 142, 143);

the "third party" call forward operations, for each of which neither the value (A to J) of said originator identifier validated by the user (16, 17, 18) nor the value (A to J) of said destination identifier validated by the user (16, 17, 18) is the value of the identifier of the definition user terminal (141, 142, 143).

18. A method for the definition of a call forward operation, within a telecommunications system (10), for forwarding calls from an originator identifier (A to J) towards a destination identifier (A to J), wherein the method comprises the following successive steps:

a user (16, 17, 18), from a definition user terminal (141, 142, 143), activates (23) a generic call forward function;

the system proposes (24) a first default value (A to J) of said originator identifier;

the user (16, 17, 18) makes a first choice between:

validating (251) said default first value (A to J) of said originator identifier;

determining (254, 256) and then validating (255, 257) a first other value (A to J) of said originator identifier, the system proposes (26) a second default value (A to J) of said destination identifier, the user (16, 17, 18) makes a second choice between:

validating (261) said second default value (A to J) of said destination identifier;

determining (262, 264) and then validating (263, 265) a second other value (A to J) of said destination identifier, furthermore comprising a step (252) for the entry, by the user, of a password so that said method is not completely executed unless the user (16, 17, 18) enters said password.

19. A method according to claim 18 wherein said step of entry, by the user (16, 17, 18), of a password immediately follows said step (23) of activation of the generic call forward function.

20. A method according to claim 19, wherein said step for the entry, by the user (16, 17, 18), of a password immediately follows the step (251, 255, 257) during which the user (16, 17, 18) validates a value (A to J) of said originator identifier, and wherein said step (252) of entry is performed only if the value (A to J) of said originator identifier validated by the user (16, 17, 18) during the previous step is not said first default value.

* * * * *